Figure 1:
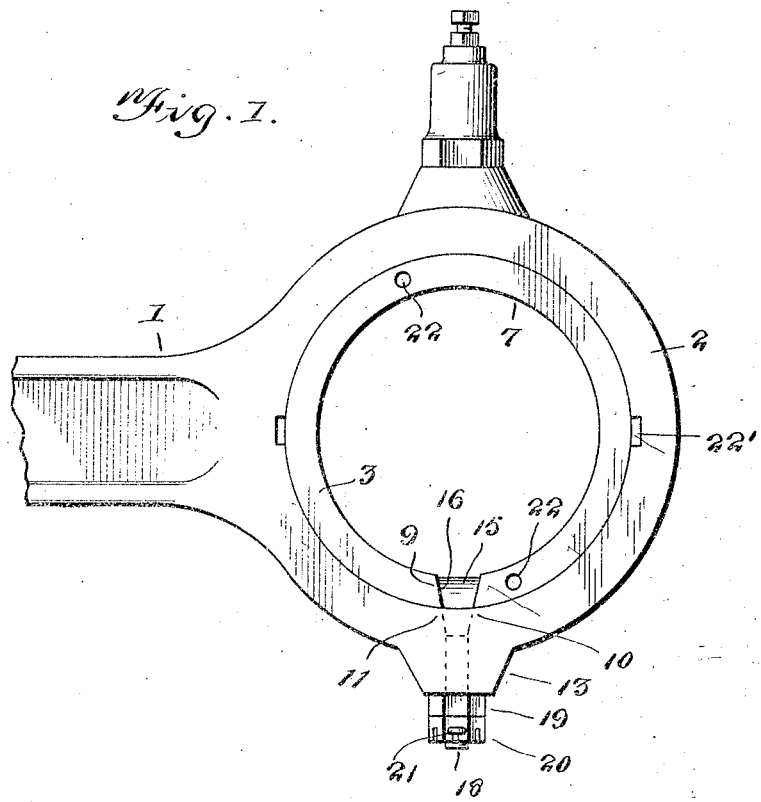

E. J. KUETTNER.
BEARING.
APPLICATION FILED MAY 15, 1917. RENEWED JAN. 7, 1919.

1,299,357.

Patented Apr. 1, 1919.
2 SHEETS—SHEET 1.

WITNESSES
E. R. Ruppert
R. F. Mehle

INVENTOR
E. J. Kuettner
BY Victor J. Evans
ATTORNEY

E. J. KUETTNER.
BEARING.
APPLICATION FILED MAY 15, 1917. RENEWED JAN. 7, 1919.

1,299,357.

Patented Apr. 1, 1919.
2 SHEETS—SHEET 2.

INVENTOR
E. J. Kuettner
BY Victor J. Evans
ATTORNEY

WITNESSES

UNITED STATES PATENT OFFICE.

EDWIN J. KUETTNER, OF RALEIGH, NORTH CAROLINA.

BEARING.

1,299,357.  Specification of Letters Patent.  Patented Apr. 1, 1919.

Application filed May 15, 1917, Serial No. 168,874. Renewed January 7, 1919. Serial No. 270,097.

*To all whom it may concern:*

Be it known that I, EDWIN J. KUETTNER, a citizen of the United States, residing at Raleigh, in the county of Wake and State of North Carolina, have invented new and useful Improvements in Bearings, of which the following is a specification.

My invention relates to bearings and relates particularly to bearings in which a bushing of bearing metal is secured within a main bearing housing.

In bearings of this type it is generally the practice to press the bushing within the housing and then secure the bushing against turning in the housing by means of a dowel pin engaging holes in the bearing housing and the bushing. In the use of bearings of this type the varying strains upon the bushing soon pound the same out of shape and the bushing becomes loose within the bearing housing. When the bearing is loose within the housing all of the strain tending to rotate the bushing within the housing is placed upon the dowel pin, which is soon sheared off, and the oil holes of the bushing and the communicating oil holes of the housing are moved out of registry with each other whereby oil is prevented from working upon the bearing surface of the bushing, and the bushing is soon destroyed.

My invention has for its primary object to provide a means for securing a bushing within a housing which may be adjusted from time to time to constantly retain the bushing in tight engagement with the housing.

A further object of my invention is to provide a split bushing and a wedge engaging the split edges of the bushing and adjustably secured upon the bearing housing whereby the bushing may be always kept in tight engagement with the housing.

Another object of my invention is to provide a split bushing and a wedge engaging the opposing edges of the bushing adjustably secured upon the bearing housing, the housing having a keyway which is engaged by the small end of the wedge whereby the bushing is not only expanded into a tight engagement with the bearing housing, but in addition is rigidly held against rotation within the bearing housing.

With these and other objects in view which will be hereinafter fully described and particularly pointed out in the claims, the invention consists in the novel construction and arrangement of parts illustrated in the accompanying drawings forming a part of this specification, in which:—

Figure 2:
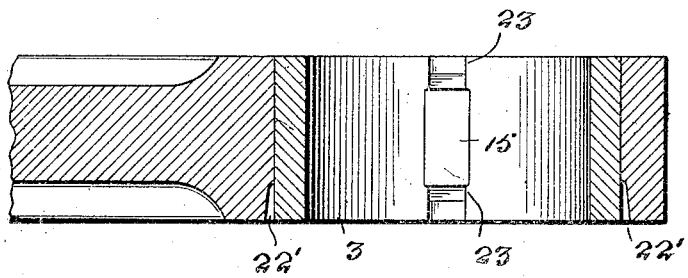
Figure 4:
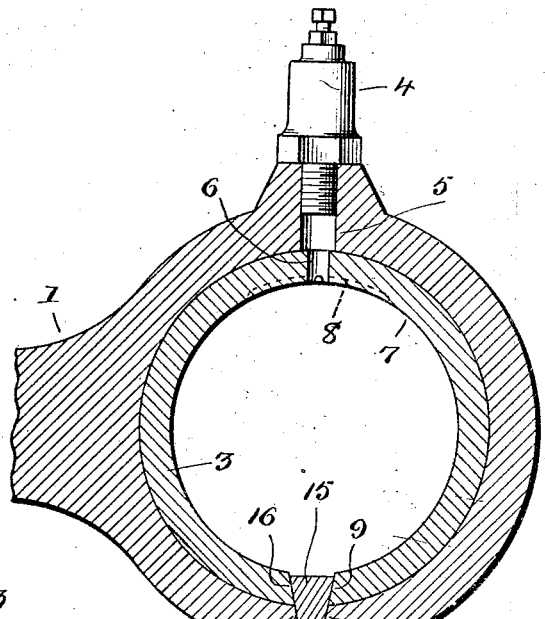
Figure 3:
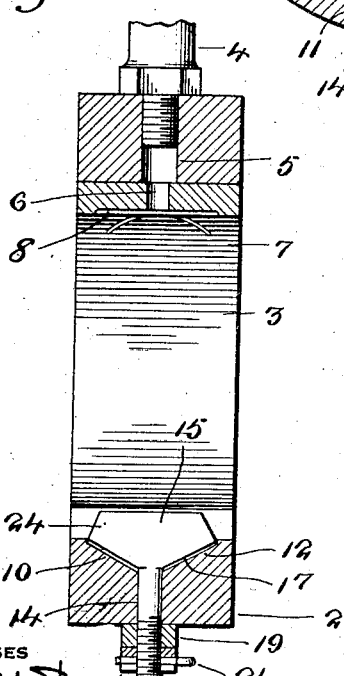
Figure 5:
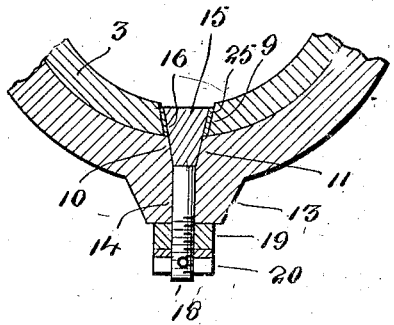

Figure 1 is a side elevation of one end of a locomotive connecting rod having a bearing therein constructed in accordance with my invention, Fig. 2 is a horizontal section of the same, Fig. 3 is a vertical section of the same in end elevation, Fig. 4 is a partial vertical section of the same in side elevation, Fig. 5 is a partial vertical section in side elevation showing the manner in which shims are inserted between the wedge and the opposing edges of the bushing after the bushing has been in long service.

Like characters of reference indicate like parts in the various views.

In the drawings 1 designates a locomotive connecting rod which has a bearing housing 2 at its end. The housing 2 has a transverse circular aperture therein in which is fitted a bushing 3. The housing 2 has an oil cup 4 formed on the upper side thereof, and an oil hole 5 leads from the bottom of said oil cup into the transverse aperture of the housing, and an oil hole 6 formed in the bushing 3 communicates with said oil hole 5 and leads therefrom to the inner or bearing surface 7 of the bushing. Grooves 8 are formed upon the bearing surface 7 of the bushing and communicate with the oil hole 6 to distribute the oil about the bearing surface 7 of the bushing as is the usual practice, see Fig. 4.

The bushing 3 is split transversely at the lower side thereof, and the opposing edges thereof converge toward each other from the inner surface of the bushing, as designated at 9, there being a space between said opposing edges. A transverse keyway 10 is formed in the bearing housing 2 and is disposed in registry with the space between the convergent edges 9 of the bushing. This keyway has the sides thereof converging from the inner surface of the bearing housing to correspond with the convergent edges 9 of the bushing, as designated at 11, and the bottom thereof converges downwardly from the sides of the housing toward the center thereof, as designated at 12. A boss 13 is formed upon the outer surface of the bearing housing 2 immediately below the keyway 10, and a radially disposed hole 14 leads from the center portion of the bottom 12 of the keyway and terminates at the lower surface of the boss. 15 designates a wedge which has the sides thereof tapered to correspond with the convergent edges 9 of the bushing, as designated at 16, and the edge of the small end thereof is tapered downwardly from the side edges thereof toward the center, as designated at 17, to correspond with the bottom 12 of the keyway 10. A shank 18 is formed on the small end of the wedge 15 and extends downwardly from the center thereof through the hole 14, and a nut 19 is screw threaded upon the lower end of said shank and engages the boss 13 to clamp the wedge in tight engagement with the convergent edges 9 of the bushing. A lock nut 20 is screw threaded upon the shank 18 to lock the nut 19 in any adjustment, and a cotter pin 21 engages a transverse hole formed at the lower end of the shank 18 to prevent either the nut 20 or the nut 19 from working off of the shank.

In assembling the above described bushing within the housing, the bushing 3 is pressed into the housing with the space between the edges 9 in registry with the keyway 10 of the housing. The shank of the wedge 15 is then inserted into the hole 14 and the nut 19 screw threaded thereon to bring the sides 16 of the wedge into tight engagement with the respective edges 9 of the bushing. This action serves to expand the bushing within the housing and to hold the same into tight engagement therewith. In addition to this the lower portion of the wedge engages the keyway 10 and serves to prevent side movement of the wedge thereby affording a solid resistance against the bushing 3 turning within the bearing housing. As above described the sides 11 of the keyway 10 are tapered to correspond with the side 16 of the wedge, and in the event that the bushing is so pounded out so that the wedge no longer clamps the bushing in tight engagement with the housing, the wedge may be drawn down into the keyway so that the lower portions of the sides 16 thereof tightly engage the sides 11 of the keyway whereby the bushing may be held against rotation in the housing pending permanent repairs. It will be noted at this point that the wedge 15 has a relatively large surface in engagement with the keyway 10 whereby the strains upon the wedge are easily resisted without danger of the wedge being sheared off. By reason of the fact that the bottom 12 of the keyway is tapered downwardly from the sides of the housing toward the center thereof, the housing is not weakened by the keyway therein, and the shank 18, extending from the lower-most point of the wedge, is not subject to the strains to which it would be subject if the wedge were shorter and the keyway not so deep at that point.

Screw threaded holes 22 are formed in the side edges of the bushing to facilitate the removal of the bushing from the housing, and short tapered keyways 22' are formed on the surface of the housing 2, on either side of the keyway 10 into which wedges may be inserted to contract the bushing 3 when removing the same from the housing, see Fig. 2.

It will be noted that the wedge 15 is not as wide as the bushing 3, the bushing overlying the wedge at either end, see Fig. 2, and as the wedge is turned down into place it crushes the corresponding surfaces of the edges 9 slightly and forms shoulders 23 at either end of the wedge. This prevents side movement of the bushing within the housing, even though the bushing may become loosened within the housing. The side edges of the wedge are diverged upwardly and inwardly, as designated at 24, and should the nut 19 become loosened the tapered formation of said edges will engage the respective shoulders 23 to prevent the wedges thereof working upwardly and contacting the bearing surface of a crank pin in the bearing, and perhaps injuring the same.

When the bushing 3 is pounded to such an extent that the wedge 15 no longer engages the opposing edges 9 shims 25 may be inserted between the engaging sides of the wedge and the opposing edges 9 so that the wedge may be again drawn down to tightly engage the bushing with the housing.

Having thus fully described my invention, I claim:—

1. In a device of the character described, the combination with a bearing housing, of a split bushing in said housing and having the opposing ends thereof convergent, and a wedge engaging said opposing ends to tightly clamp said bushing in engagement with said housing.

2. In a device of the character described, the combination with a bearing housing, of a split bushing in said housing and having the opposing ends thereof convergent, a wedge engaging said opposing ends to tightly clamp said bushing in engagement with said housing, and means for retaining said wedge in proper engagement with said opposing ends.

3. In a device of the character described, the combination with a bearing housing, of a split bushing in said housing and having the opposite ends thereof convergent, a wedge engaging said opposing ends to tightly clamp said bushing in engagement with said housing, and means associated with said housing for retaining said wedge in proper engagement with said opposing ends.

4. In a device of the character described, the combination with a bearing housing having a radially disposed hole therein, of a split bushing in said housing and having the opposing ends thereof convergent toward each other from the inner surface of the bushing, a wedge tapered to correspond with said opposing ends, a shank extending from the small end of said wedge and engaging said hole and a nut screw threaded upon said shank exteriorly of said housing to clamp said wedge in tight engagement with said opposing ends of the bushing.

5. In a device of the character described, the combination with a bearing housing having a keyway formed on the inner surface thereof and having a radially disposed hole leading from said keyway, of a split bushing in said housing and having the opposing ends thereof convergent toward each other from the inner surface of the bushing, a wedge tapered to correspond with said opposing ends, the small end of said wedge being adapted to engage said keyway, a shank extending from the small end of said wedge and engaging said hole, and a nut screw threaded upon said shank exteriorly of said housing to clamp said wedge in tight engagement with said opposing ends of the bushing.

6. In a device of the character described, the combination with a bearing housing having a keyway having the bottom thereof tapered downwardly from the sides of the housing and having a radially disposed hole leading from the center of said keyway, a split bushing in said housing and having the opposing ends thereof converging toward each other from the inner surface of the bushing, a wedge tapered to correspond with said opposing ends, the ends of the small end of said wedge being tapered downwardly from the side ends thereof toward the center, a shank extending from the center of the small end of the wedge and extending through said hole, a nut screw threaded upon said shank exteriorly of said bushing and adapted to clamp said wedge in tight engagement with the opposing ends of said bushing.

7. In a device of the character described, the combination with a bearing housing, of a transversely split bushing in said housing and having the opposing ends thereof converging toward each other from the inner surface of the bushing, a wedge tapered to correspond with said opposing ends, said wedge being shorter than the width of the bushing and having the sides thereof diverging upwardly from the small end of the wedge, and means associated with said housing and having connection with said wedge to clamp said wedge in tight engagement with said bushing.

8. In a device of the character described, the combination with a bearing housing, of a split bushing in said housing having convergent opposing ends, and means adjustable through the housing and engaging said opposing ends to tightly clamp said bushing in engagement with said housing.

In testimony whereof I affix my signature.

EDWIN J. KUETTNER.

Copies of this patent may be obtained for five cents each, by addressing the "Commissioner of Patents, Washington, D. C."